United States Patent
Runeson et al.

(10) Patent No.: US 9,509,724 B2
(45) Date of Patent: Nov. 29, 2016

(54) HANDLING SESSION INITIATION PROTOCOL MESSAGES IN A WIRELESS TELECOMMUNICATIONS DEVICE

(71) Applicant: Ericsson Modems SA, Le Grand-Saconnex (CH)

(72) Inventors: Stefan Runeson, Lund (SE); Ivo Sedlacek, Landskrona (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 244 days.

(21) Appl. No.: 14/374,614

(22) PCT Filed: Feb. 20, 2013

(86) PCT No.: PCT/EP2013/053372
§ 371 (c)(1),
(2) Date: Jul. 25, 2014

(87) PCT Pub. No.: WO2013/124313
PCT Pub. Date: Aug. 29, 2013

(65) Prior Publication Data
US 2015/0039773 A1     Feb. 5, 2015

Related U.S. Application Data

(60) Provisional application No. 61/602,140, filed on Feb. 23, 2012.

(30) Foreign Application Priority Data

Feb. 23, 2012 (EP) .................................. 12156646

(51) Int. Cl.
*G06F 15/16* (2006.01)
*H04L 29/06* (2006.01)
*H04W 80/10* (2009.01)

(52) U.S. Cl.
CPC ......... *H04L 65/1006* (2013.01); *H04L 65/105* (2013.01); *H04L 65/1016* (2013.01); *H04L 65/1069* (2013.01); *H04L 65/1073* (2013.01); *H04W 80/10* (2013.01)

(58) Field of Classification Search
CPC ....................... H04L 65/1016; H04L 65/1006
USPC .................................................. 709/227, 228
See application file for complete search history.

(56) References Cited

U.S. PATENT DOCUMENTS

| | | | |
|---|---|---|---|
| 2004/0243680 A1* | 12/2004 | Mayer | G06F 9/545 709/206 |
| 2007/0081519 A1* | 4/2007 | Ramaswamy | H04L 12/2856 370/352 |
| 2008/0024470 A1 | 1/2008 | Andre et al. | |
| 2008/0244709 A1 | 10/2008 | George et al. | |

(Continued)

FOREIGN PATENT DOCUMENTS

WO     2004/084055 A1     9/2004

OTHER PUBLICATIONS

International Search Report issued in corresponding International application No. PCT/EP2013/053372, date of mailing Mar. 11, 2013.

*Primary Examiner* — Hieu Hoang
(74) *Attorney, Agent, or Firm* — Patent Portfolio Builders PLLC

(57) ABSTRACT

A wireless telecommunications device configured to use Session Initiation Protocol in communication with other telecommunications devices comprises a modem subsystem configured to deploy Internet Protocol Multimedia Subsystem services using Session Initiation Protocol and comprising a Session Initiation Protocol stack; and an application processing engine configured to deploy Internet Protocol Multimedia Subsystem services using Session Initiation Protocol and comprising a Session Initiation Protocol stack. The device comprises a logical element configured to capture Session Initiation Protocol messages from Internet Protocol Multimedia Subsystem services to an external Session Initiation Protocol proxy server and to function as a Session Initiation Protocol Back-to-Back User Agent; and send to the external Session Initiation Protocol proxy server Session Initiation Protocol messages based on the captured messages. The need for special Application Programming Interface between the two subsystems is avoided, and multiple SIP request messages need no longer be sent.

14 Claims, 6 Drawing Sheets

(56) References Cited

U.S. PATENT DOCUMENTS

| | | | |
|---|---|---|---|
| 2008/0311888 A1* | 12/2008 | Ku | H04M 7/0024 455/414.1 |
| 2009/0005038 A1* | 1/2009 | Yasrebi | H04L 65/4038 455/435.1 |
| 2009/0245233 A1 | 10/2009 | Prasad et al. | |
| 2011/0175976 A1 | 7/2011 | Cho | |
| 2012/0195235 A1* | 8/2012 | Balla | H04L 65/1006 370/259 |
| 2013/0188633 A1* | 7/2013 | Noldus | H04L 65/1006 370/352 |

\* cited by examiner

⋯▶ Outgoing SIP messages from IMS service on APE
- -▶ Outgoing SIP messages from IMS service on Modem
⟶ Outgoing SIP messages from SBP to P-CSCF ① REGISTER
Contact: sip:10.0.0.1:3000;service1

② REGISTER
Contact: sip:10.0.0.1:3001;service2

③ REGISTER
Contact: sip:10.0.0.1:5060;service1;service2

HANDLING SESSION INITIATION PROTOCOL MESSAGES IN A WIRELESS TELECOMMUNICATIONS DEVICE

TECHNICAL FIELD

The invention relates to handling Session Initiation Protocol messages in a wireless telecommunications device configured to use Session Initiation Protocol in communication with at least one other telecommunications device.

BACKGROUND

Session Initiation Protocol (SIP) is a signalling protocol used e.g. for controlling communication sessions, such as voice or video calls over Internet Protocol (IP). The protocol is used for creating, modifying and terminating two-party or multiparty sessions. SIP applications also include video conferencing, streaming multimedia distribution, instant messaging, file transfers and online games. A SIP telecommunications device, e.g. a SIP phone, is a SIP user agent that provides traditional call functions of a telephone, such as dial, answer, reject, hold/unhold, and call transfer. SIP is increasingly implemented as a standard telephony platform.

One application using SIP is Internet Protocol Multimedia Subsystem (IMS) services. IMS is an architectural framework for delivering Internet Protocol (IP) multimedia services, and it uses a protocol, such as the SIP protocol.

The major parts of a mobile phone using SIP consist of a modem subsystem and an Application Processing Engine (APE). In many cases IMS services are deployed both on the modem subsystem and the APE. A telephony oriented IMS service (e.g. Voice over Long-Term Evolution (LTE) or multimedia telephony IMS service) is naturally deployed on the modem subsystem as a counterpart to the circuit switched telephony service. A rich communication IMS service (e.g. Rich Communication Suite (RCS) presence and file transfer) is naturally deployed on the APE, close to deployment of phone book and file system.

The APE and the modem subsystem cannot communicate directly without the use of special Application Programming Interface (API) between them. It is intricate to define such an Application Programming Interface, since the two subsystems belong to different administrative domains.

Both the modem subsystem and the APE may have its own SIP stack, so that the IMS services are sending their SIP registrations to the SIP registrar completely independent of each other. The problem with this is that since every IMS service performs its own SIP registration, multiple SIP request messages are sent from the mobile phone to the SIP registrar. This means wasting of both network resources and processing and storage resources at the SIP registrar.

One way to avoid this could be to have only one common SIP stack deployed on the modem subsystem and to let all IMS services make use of this common SIP stack. However, a problem with this is that a common SIP stack used by both IMS services on the APE and IMS services on the modem subsystem requires new APIs between the APE and the modem subsystem. This is disadvantageous due to the fact that the APE and the modem subsystem belong to different administrative domains. Furthermore, no standardized or de facto API exists for this purpose.

US 2009/0245233 shows a system in which an application uses a Session Initiation Protocol (SIP) user agent and a third party SIP stack to establish connection and manage sessions and call states. The SIP user agent comprises special application interface needed to enable the application to interface with the third party SIP stack, while the third party SIP stack enabled the SIP user agent to manage SIP services associated with the application and a session.

SUMMARY

Therefore, it is an object of embodiments of the invention to obviate at least some of the above disadvantages and provide an improved method of handling Session Initiation Protocol messages in a wireless telecommunications device.

According to embodiments of the invention the object is achieved in a method of handling Session Initiation Protocol messages in a wireless telecommunications device configured to use Session Initiation Protocol in communication with at least one other telecommunications device, wherein the device comprises a modem subsystem configured to deploy Internet Protocol Multimedia Subsystem services using Session Initiation Protocol and comprising a Session Initiation Protocol stack for exchanging Session Initiation Protocol messages between Internet Protocol Multimedia Subsystem services on the modem subsystem and an external Session Initiation Protocol proxy server; and an application processing engine configured to deploy Internet Protocol Multimedia Subsystem services using Session Initiation Protocol and comprising a Session Initiation Protocol stack for exchanging Session Initiation Protocol messages between Internet Protocol Multimedia Subsystem services on the application processing engine and the external Session Initiation Protocol proxy server. The object is achieved when the method comprises the steps of capturing Session Initiation Protocol messages from Internet Protocol Multimedia Subsystem services to the external Session Initiation Protocol proxy server in a logical element configured to function as a Session Initiation Protocol Back-to-Back User Agent with a Session Initiation Protocol stack connected to the Session Initiation Protocol stacks of the modem subsystem and the application processing engine and to the external Session Initiation Protocol proxy server; and sending from said logical element to the external Session Initiation Protocol proxy server Session Initiation Protocol messages based on said captured Session Initiation Protocol messages.

When Session Initiation Protocol messages from Internet Protocol Multimedia Subsystem services to the external Session Initiation Protocol proxy server are captured in a logical element that is configured to function as a Session Initiation Protocol Back-to-Back User Agent, the need for special Application Programming Interface (API) between the two subsystems is avoided, and multiple SIP request messages need no longer be sent from the mobile phone to the SIP registrar, because the Initiation Protocol Back-to-Back User Agent can now merge SIP messages from the IMS services of the two subsystems.

In one embodiment the method further comprises the steps of storing in said logical element, when an outgoing SIP REGISTER request message is received from a not registered Internet Protocol Multimedia Subsystem service deployed in the modem subsystem or the application processing engine, parameters specific for that Internet Protocol Multimedia Subsystem service; merging, if parameters for other previously registered Internet Protocol Multimedia Subsystem services are already stored, the parameters for the not registered Internet Protocol Multimedia Subsystem service with the parameters for the previously registered Internet Protocol Multimedia Subsystem services; and sending a SIP REGISTER request message with the merged parameters to the external Session Initiation Protocol proxy server.

Merging parameters from several IMS services greatly reduces the number of SIP registration and re-registration requests sent from the device to the external proxy server.

In such embodiment, the method may further comprise the step of sending, when a SIP REGISTER response message is received from the external Session Initiation Protocol proxy server, a SIP REGISTER response message to the not registered Internet Protocol Multimedia Subsystem service, from which the outgoing SIP REGISTER request message was received.

In some embodiments, the method further comprises the steps of storing in said logical element, when a first outgoing SIP SUBSCRIBE request message is received from an Internet Protocol Multimedia Subsystem service deployed in the modem subsystem or the application processing engine, that Internet Protocol Multimedia Subsystem service as a subscriber; sending a SIP SUBSCRIBE request message to the external Session Initiation Protocol proxy server; and sending, when a SIP SUBSCRIBE response message is received from the external Session Initiation Protocol proxy server, a SIP SUBSCRIBE response message to that Internet Protocol Multimedia Subsystem service.

In such embodiments, the method may further comprise the step of storing, when a further outgoing SIP SUBSCRIBE request message is received from an Internet Protocol Multimedia Subsystem service deployed in the modem subsystem or the application processing engine, that Internet Protocol Multimedia Subsystem service as a subscriber; sending a SIP SUBSCRIBE response message to that Internet Protocol Multimedia Subsystem service; and sending a SIP NOTIFY request message to that Internet Protocol Multimedia Subsystem service with information from a SIP NOTIFY request message previously received from the external Session Initiation Protocol proxy server. In this way also the number of SIP SUBSCRIBE request messages can be considerably reduced.

Some embodiments of the invention also relate to a wireless telecommunications device configured to use Session Initiation Protocol for controlling communication sessions with at least one other telecommunications device, the device comprising a modem subsystem configured to deploy Internet Protocol Multimedia Subsystem services using Session Initiation Protocol and comprising a Session Initiation Protocol stack for exchanging Session Initiation Protocol messages between Internet Protocol Multimedia Subsystem services on the modem subsystem and an external Session Initiation Protocol proxy server; and an application processing engine configured to deploy Internet Protocol Multimedia Subsystem services using Session Initiation Protocol and comprising a Session Initiation Protocol stack for exchanging Session Initiation Protocol messages between Internet Protocol Multimedia Subsystem services on the application processing engine and the external Session Initiation Protocol proxy server. The device further comprises a logical element configured to capture Session Initiation Protocol messages from Internet Protocol Multimedia Subsystem services to the external Session Initiation Protocol proxy server and to function as a Session Initiation Protocol Back-to-Back User Agent with a Session Initiation Protocol stack connected to the Session Initiation Protocol stacks of the modem subsystem and the application processing engine and to the external Session Initiation Protocol proxy server; and send to the external Session Initiation Protocol proxy server Session Initiation Protocol messages based on said captured Session Initiation Protocol messages.

Embodiments corresponding to those mentioned above for the method also apply for the wireless telecommunications device.

In some embodiments, the device further comprises a packet filter with the Internet Protocol address and port number of the external Session Initiation Protocol proxy server, said packet filter being configured to forward packets matching the filter to said logical element.

The logical element may further be configured to send, when an incoming SIP OPTIONS request message is received, a SIP OPTIONS request message to all registered Internet Protocol Multimedia Subsystem services in the modem subsystem and the application processing engine; collect SIP OPTIONS response messages from the registered Internet Protocol Multimedia Subsystem services; merge received SIP OPTIONS response messages into a common SIP OPTIONS response message; and send the merged SIP OPTIONS response message back to the originator of the incoming SIP OPTIONS request message. This gives a common SIP OPTIONS response for all Internet Protocol Multimedia Subsystem services in the device.

In some embodiments, the logical element is further configured to act as a Session Initiation Protocol proxy server for Session Initiation Protocol messages that are not handled by the Session Initiation Protocol Back-to-Back User Agent.

Some embodiments of the invention relate to a computer program and a computer readable medium with program code means for performing the method described above.

BRIEF DESCRIPTION OF THE DRAWINGS

Embodiments of the invention will now be described more fully below with reference to the drawings, in which.

DETAILED DESCRIPTION

Figure 1:
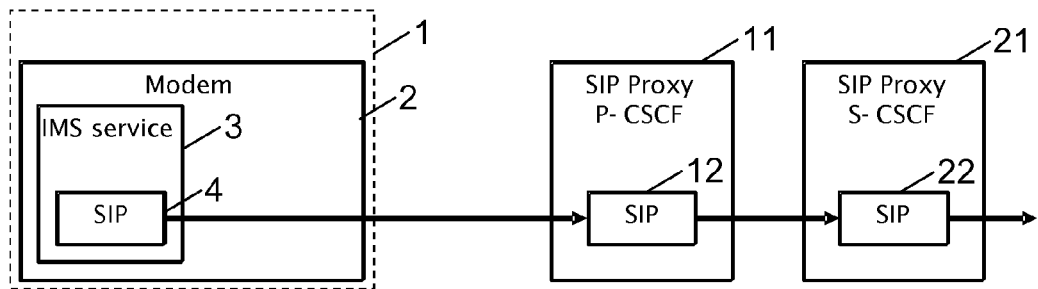
FIG. 1 shows an example of a telecommunications device configured to use Session Initiation Protocol (SIP)

FIG. 1 shows an example of a telecommunications device 1 configured to use Session Initiation Protocol (SIP), which is a signalling protocol used for controlling communication sessions, such as voice or video calls over Internet Protocol (IP). The protocol is used for creating, modifying and terminating two-party or multiparty sessions. SIP applications also include video conferencing, streaming multimedia distribution, instant messaging, file transfers and online games.

A SIP telecommunications device, e.g. a SIP phone, is a SIP user agent that provides traditional call functions of a telephone, such as dial, answer, reject, hold/unhold, and call transfer. SIP is increasingly implemented as a standard telephony platform. These functions are implemented on a modem subsystem 2 of the telecommunications device 1

One type of application using SIP is Internet Protocol Multimedia Subsystem (IMS) services. IMS is an architectural framework for delivering Internet Protocol (IP) multimedia services, and it uses a protocol, such as the SIP protocol. Thus a number of telephony oriented IMS services, such as Voice over Long-Term Evolution (LTE) or multimedia telephony IMS service, is naturally deployed on the modem subsystem 2 as a counterpart to the circuit switched telephony service. This is illustrated with the IMS service 3 in FIG. 1. The IMS service 3 has a SIP stack 4 used for communication with corresponding SIP stacks in other SIP network elements.

In FIG. 1 the IMS service 3 communicates with a SIP proxy server 11 with the SIP stack 12. The SIP proxy server 11 can be a Proxy-Call Session Control Function (P-CSCF), which is the first point of contact for an IMS terminal, i.e. the telecommunications device 1. The SIP proxy server 11 again communicates with another SIP proxy server 21 with the SIP stack 22. The SIP proxy server 21 can be a Serving-Call Session Control Function (S-CSCF), which is a central SIP proxy server in the network.

SIP makes use of transactions and messages. There are two different types of SIP messages, i.e. request messages and response messages, and a transaction consists of e.g. a client request that invokes a particular function on a server and results in a response that is sent back to the client. A transaction can also be a server request that should be responded to by a client.

Figure 2:
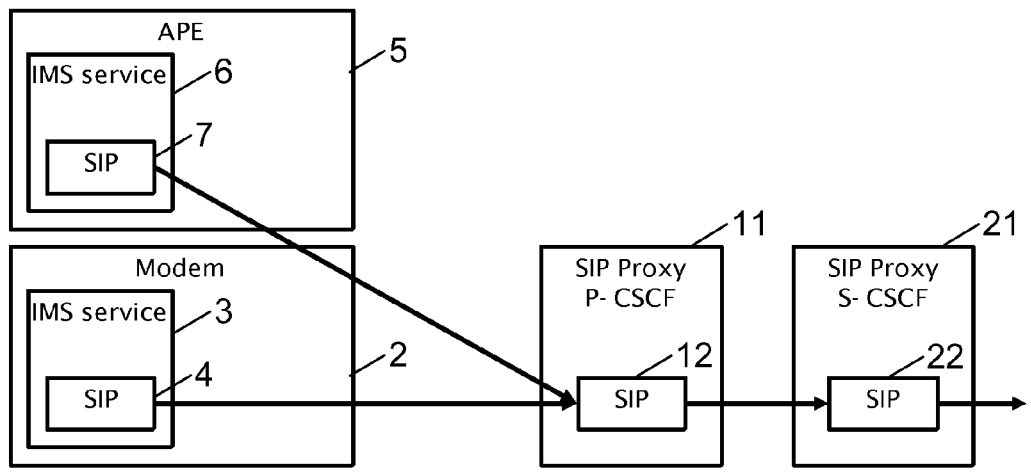
FIG. 2 shows a SIP telecommunications device with two subsystems, each having their own SIP stack.

As mentioned above, the major parts of a mobile phone using SIP consists of two subsystems, i.e. a modem subsystem and an Application Processing Engine (APE), and in many cases IMS services are deployed both on the modem subsystem and the APE. While a telephony oriented IMS service (e.g. Voice over Long-Term Evolution (LTE) or multimedia telephony IMS service) is naturally deployed on the modem subsystem as a counterpart to the circuit switched telephony service, a rich communication IMS service (e.g. Rich Communication Suite (RCS) presence and file transfer) is naturally deployed on the APE, close to deployment of phone book and file system. This is illustrated in FIG. 2 with the IMS service 6 deployed on the APE 5. The IMS service 6 has a SIP stack 7 used for communication with corresponding SIP stacks in other SIP network elements, such as the SIP proxy server 11.

The APE and the modem subsystem cannot communicate directly without the use of special Application Programming Interface (API) between them. Thus in FIG. 2, both the modem subsystem and the APE have their own SIP stack, I.e. the SIP stack 4 in the modem subsystem 2 and the SIP stack 7 in the APE 5, so that the IMS services are sending their SIP registrations to the SIP registrar (a server that accepts SIP REGISTER requests from a SIP client, e.g. an IMS service) completely independent of each other. This means that since every IMS service performs its own SIP registration, multiple SIP request messages are sent from the mobile phone to the SIP registrar. This means wasting of both network resources and processing and storage resources at the SIP registrar.

Figure 3:
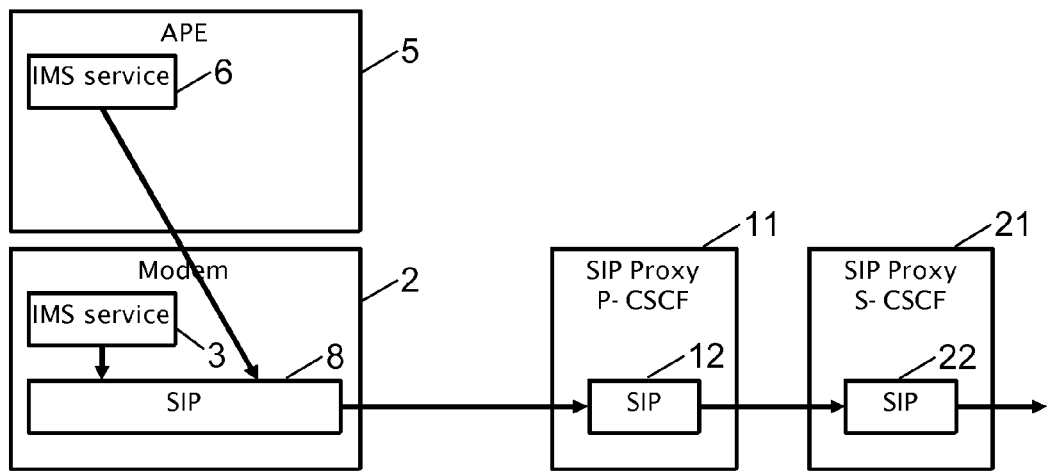
FIG. 3 shows a SIP telecommunications device with two subsystems sharing a common SIP stack.

As illustrated in FIG. 3, this can be avoided by having only one common SIP stack 8 deployed on the modem subsystem 2 and to let all IMS services 3 and 6 make use of this common SIP stack 8. However, a problem with this is that the common SIP stack 8 used by both IMS services 6 on the APE 5 and IMS services 3 on the modem subsystem 2 as mentioned above requires new Application Programming Interfaces between the APE and the modem subsystem. This is disadvantageous due to the fact that the APE and the modem subsystem belong to different administrative domains. Furthermore, no standardized or de facto Application Programming Interface exists for this purpose.

Figure 4:
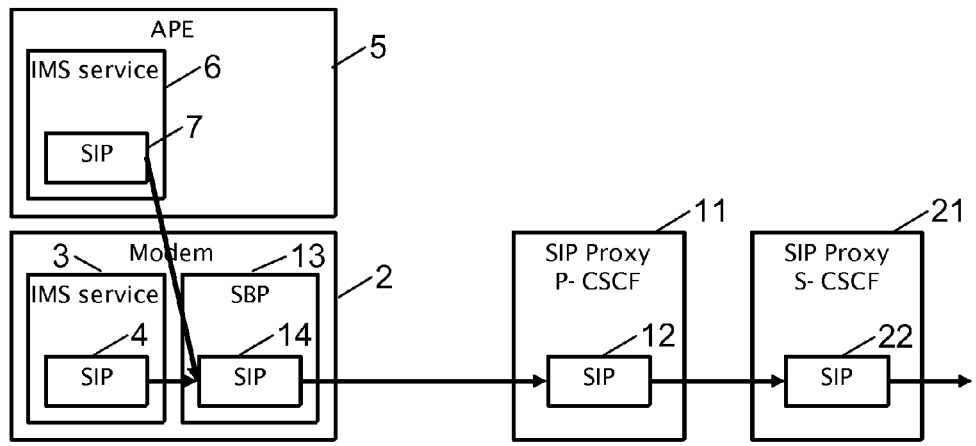
FIG. 4 shows a SIP telecommunications device with two subsystems and a logical element acting as a SIP B2BUA connected to the two subsystems.

In FIG. 4 a new entity or logical element 13 with its own SIP stack 14 is arranged in the modem subsystem 2. The SIP stack 14 is connected to the SIP stacks 4 and 7 of the modem subsystem 2 and the APE 5, respectively, and also to the SIP stack 12 of the external SIP proxy server P-CSCF 11. The logical element 13 is in the following also designated as SBP, because as described below the logical element is configured to function as a SIP Back-to-Back User Agent (SIP B2BUA) and possibly also as a SIP proxy server.

Figure 5:
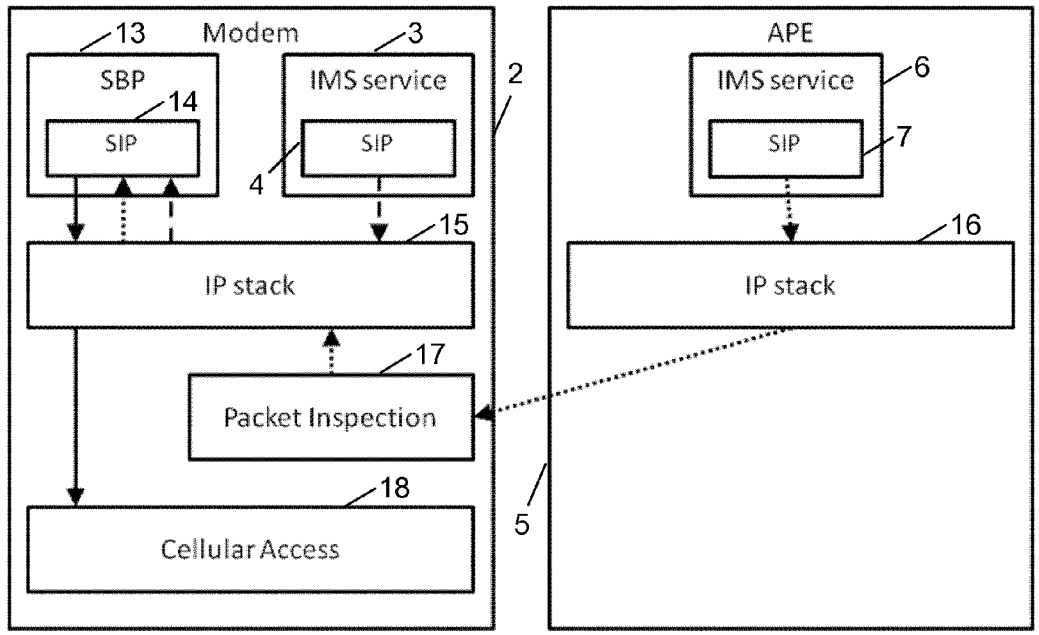
FIG. 5 shows in more detail the capturing of SIP messages from IMS services in the logical element.

The logical element SBP 13 is capturing all SIP messages from the IMS services 3 and 6 with destination to the outbound SIP proxy server (P-CSCF) 11. This is described in more detail in FIG. 5. The outgoing SIP messages from the IMS service 3 of the modem subsystem 2 go from the SIP stack 4 to the SIP stack 14 of the SBP 13 via an IP stack 15 as indicated by the dashed arrows in FIG. 5. A packet filter 17 with the IP address and port number of the P-CSCF is installed in the modem subsystem, and all packets from IMS services 6 on the APE 5 matching the filter are forwarded to the SBP via the IP stack 15 as indicated by the dotted arrows in FIG. 5. The SIP stack 7 on the APE 5 is not aware of the SBP. The SIP stack 7 on the APE 5 behaves as if it is sending and receiving SIP messages directly to and from the P-CSCF. Based on the SIP messages captured by the logical element SBP 13, SIP messages are then sent from the SIP stack 14 via the IP stack 15 and the cellular access 18 to the external SIP proxy server P-CSCF as indicated by the full line arrows in FIG. 5. These SIP messages may either be the captured SIP messages substantially unchanged, or they may be merged with other captured SIP messages depending on the type of the captured SIP messages, as it will be described in more detail below.

Figure 6:
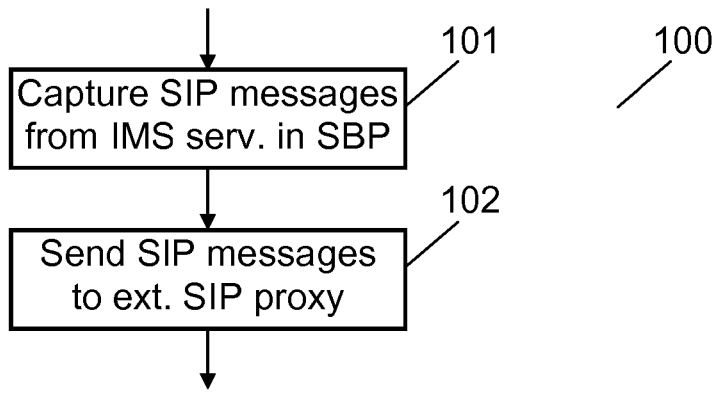
FIG. 6 shows a flow chart illustrating the capturing of SIP messages from IMS services in the logical element.

This is also illustrated in the flow chart 100 of FIG. 6. First, in step 101 the SIP messages from IMS services on the modem subsystem 2 and/or the APE 5 are captured in the logical element SBP 13. Then, in step 102 SIP messages based on the captured SIP messages are sent to the external SIP proxy server P-CSCF.

Figure 7:
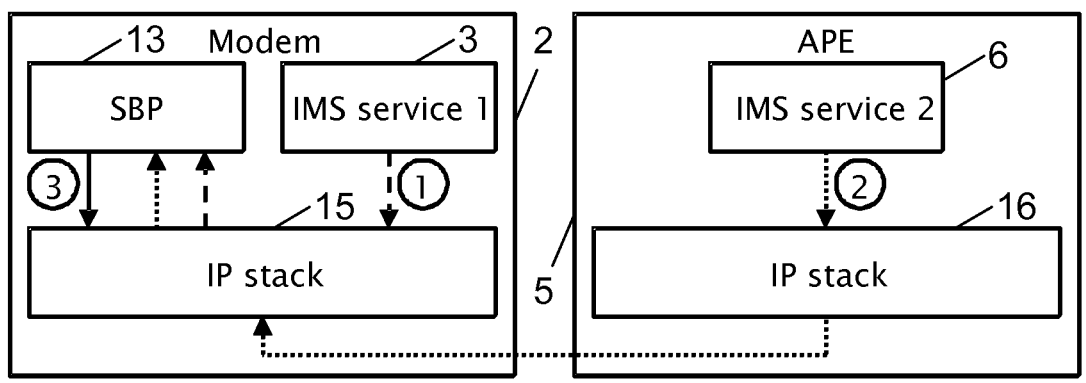
FIG. 7 shows how the logical element acts as a SIP B2BUA for SIP registration related transactions.

The SBP 13 may act as a SIP B2BUA for SIP registration related transactions. SIP registration related transactions are SIP REGISTER transactions and SIP SUBSCRIBE and SIP NOTIFY transactions for "reg" events. SBP is merging SIP REGISTER messages from all running IMS services so that one single SIP REGISTER message carries information about all running IMS services to the SIP registrar. This is illustrated in FIG. 7. Furthermore, the SBP may be handling authentication and the Security Association (SA) to the outbound SIP proxy server (P-CSCF). Each of these transactions are described in more detail below.

For SIP registration related transactions the SBP 13 is acting as a SIP B2BUA. Acting as a SIP B2BUA, SBP has different behaviour towards different entities. From any IMS service point of view (either on the modem subsystem 2 or the APE 5), SBP 13 is handling SIP registration related transactions as if the IMS service was the only IMS service running in the mobile phone. From P-CSCF and S-CFCF point of view, SBP 13 is handling SIP registration related transactions on behalf of all IMS services running in the mobile phone.

Figure 8:
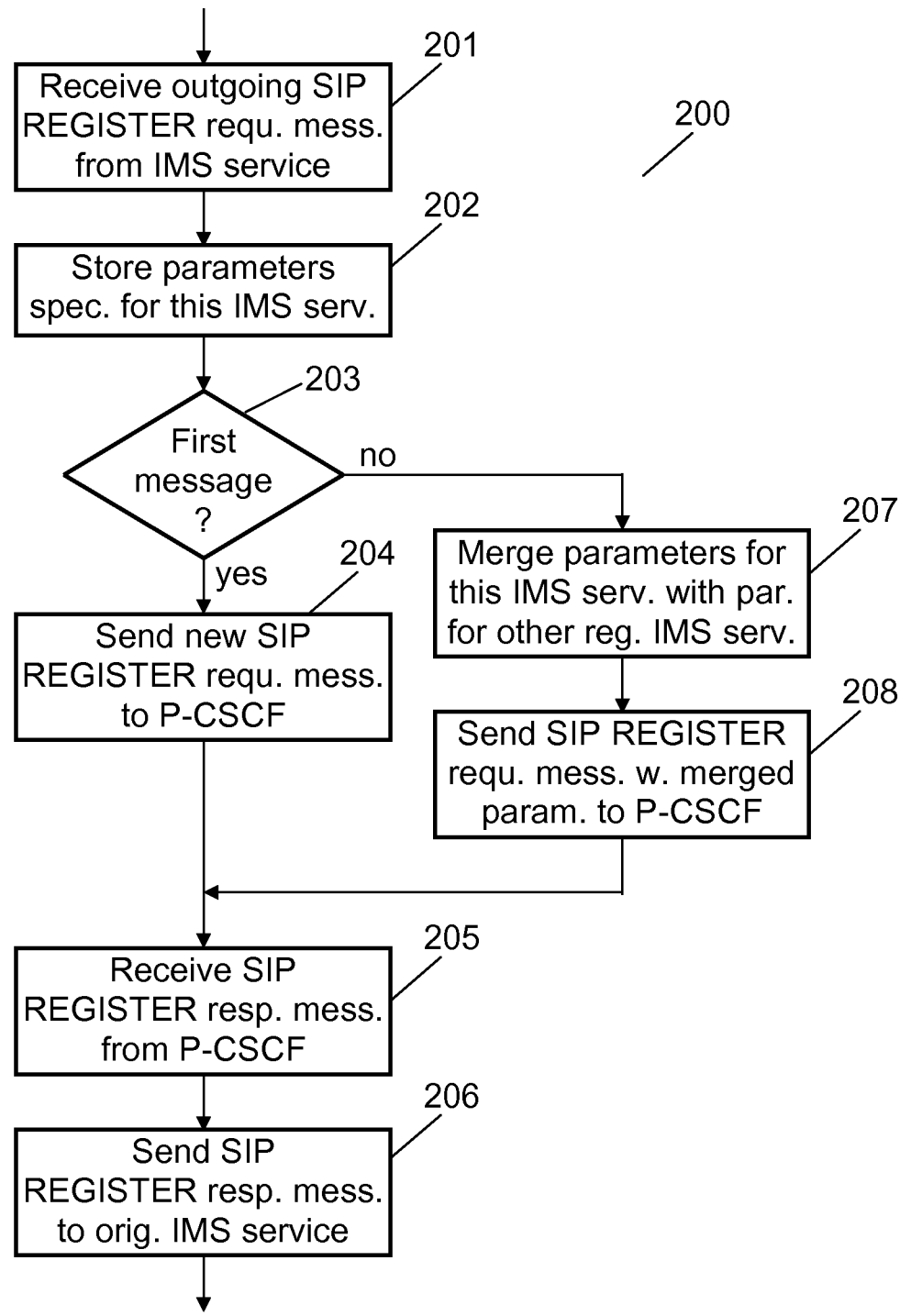
FIG. 8 shows a flow chart illustrating the handling of SIP REGISTER Transactions.

The handling of SIP REGISTER Transactions is illustrated in the flow chart 200 shown in FIG. 8.

When the SBP 13 receives the first outgoing SIP REGISTER request message in step 201 from any IMS service, the SBP will handle the message in following way. In step 202 all parameters in the SIP REGISTER message that are specific to this IMS service, e.g. feature tags in the Contact header, are stored. If it is detected in step 203 that the received SIP REGISTER request message is a first one, a new SIP REGISTER request message is sent in step 204 to the P-CSCF with parameters specific for this IMS service. When SIP REGISTER response is received from the P-CSCF in step 205, SBP will in step 206 send a SIP REGISTER response back to the originating IMS service.

When the SBP receives another outgoing SIP REGISTER request message in step 201 from any other IMS service, the SBP will handle the message in following way. In step 202 all parameters in the SIP REGISTER message that are specific to this IMS service, e.g. feature tags in the Contact header, are stored. If it is detected in step 203 that the received SIP REGISTER request message is not a first one, all parameters specific for this IMS service are merged in step 207 with all parameters specific for all other registered IMS services. In step 208 a SIP re-REGISTER request message is then sent to the P-CSCF with the merged parameters for all registered IMS services. When SIP REGISTER response is received from the P-CSCF in step 205, SBP will in step 206 send a SIP REGISTER response back to the originating IMS service.

In order to avoid frequent transmissions of re-registration e.g. after power-on of the mobile phone, the SBP may delay transmission of the registration message from the first IMS service in order to await possible registration message from any other IMS service.

Figure 9:
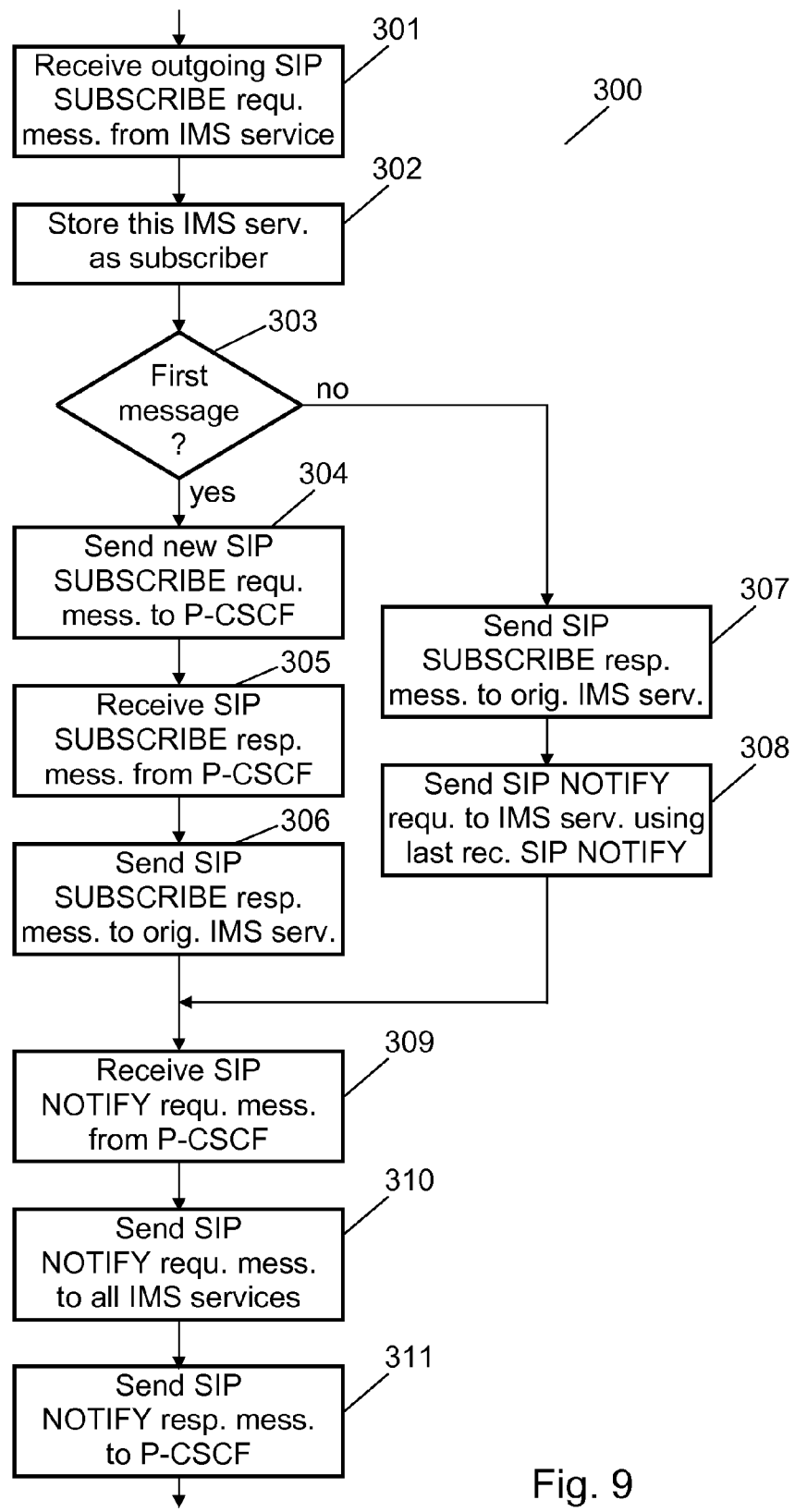
FIG. 9 shows a flow chart illustrating the handling of SIP SUBSCRIBE and SIP NOTIFY Transactions for "reg" Events.

The handling of SIP SUBSCRIBE and SIP NOTIFY Transactions for "reg" Events is illustrated in the flow chart 300 shown in FIG. 9.

When the SBP 13 receives the first outgoing SIP SUBSCRIBE request message for "reg" events in step 301 from any IMS service, the SBP will handle the message in following way. In step 302 this IMS service is stored as subscriber for "reg" events. If it is detected in step 303 that the received SIP SUBSCRIBE request message is a first one, a new SIP SUBSCRIBE request message for "reg" events is sent in step 304 to the P-CSCF. When SIP SUBSCRIBE response is received in step 305 from the P-CSCF, SBP 13 will send a SIP SUBSCRIBE response back to the originating IMS service in step 306.

When the SBP 13 receives another outgoing SIP SUBSCRIBE request message for "reg" events in step 301 from any other IMS service, the SBP will handle the message in following way. In step 302 this IMS service is stored as subscriber for "reg" events. If it is detected in step 303 that the received SIP SUBSCRIBE request message is not a first one, a SIP SUBSCRIBE response is sent back to the originating IMS service in step 307, and a SIP NOTIFY request message is sent to the originating IMS service in step 308 with the information from the last received SIP NOTIFY request message from the P-CSCF.

When SBP 13 in step 309 receives a SIP NOTIFY request for "reg" event from the P-CSCF, the SBP sends in step 310 a SIP NOTIFY request to all IMS services that are subscribers for "reg" events and sends in step 311a SIP NOTIFY response back to the P-CSCF.

The SBP 13 is furthermore handling authentication and the Security Association (SA) to the outbound SIP proxy server (P-CSCF). The SBP will thus autonomously handle SIP response messages with response code 401 and 407. This means that there is a trusted relationship between the SBP and the IMS services, both on the modem subsystem and the APE.

Figure 10:
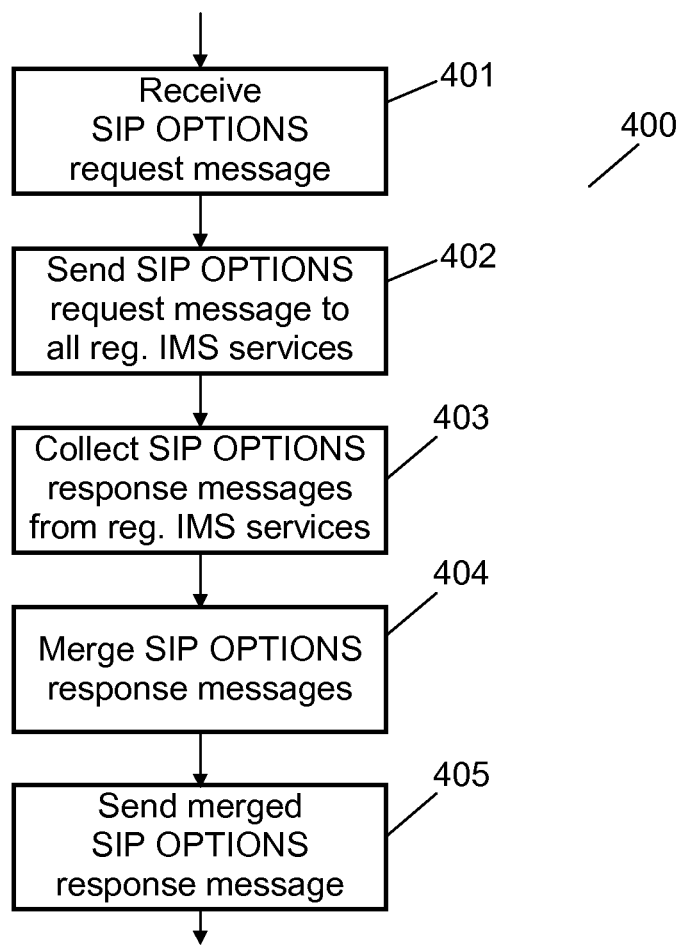
FIG. 10 shows a flow chart illustrating the handling of Incoming SIP OPTIONS Transactions.

The handling of Incoming SIP OPTIONS Transactions is described below with reference to the flow chart 400 in FIG. 10.

When a mobile phone in step 401 receives a SIP OPTIONS request message without any Accept-Contact or Reject-Contact headers, it is expected to take all IMS services in the mobile phone into account when constructing the SIP OPTIONS response message.

The SBP may handle incoming SIP OPTIONS request as a B2BUA in following way. In step 402 the SIP OPTIONS request is sent further on to all registered IMS services in the mobile phone. In step 403 all SIP OPTIONS responses from the registered IMS services are collected and all received SIP OPTIONS responses are merged in step 404 into one common SIP OPTIONS response, representing all registered IMS services. Finally, in step 405 the merged SIP OPTIONS response is sent back to the originator of the SIP OPTIONS request.

Other SIP Transactions, i.e. SIP transactions besides the SIP registration related transactions and incoming SIP OPTIONS transactions may be handled by SBP in any of following ways:

SBP acting in as SIP B2BUA.
SBP acting in as stateless SIP proxy server.
SBP acting in as stateful SIP proxy server.

These three methods have different level of complexity to implement and different memory requirements. The SIP B2BUA is the most complex method and has highest memory requirement. The SBP may thus be configured to act as a SIP proxy server instead of a SIP B2BUA for other SIP transactions.

With the solution described above, there is neither wasting of network resources nor wasting of processing and storage resources at the SIP registrar. Further, there is no requirement on new Application Programming Interfaces between the APE and the modem subsystem. Finally, there are no dependencies between different IMS services. Every IMS service is developed as if it is the only IMS service on the mobile phone. This is important since IMS services may be developed by $3^{rd}$ party developers.

Although various embodiments of the present invention have been described and shown, the invention is not restricted thereto, but may also be embodied in other ways within the scope of the subject-matter defined in the following claims.

The invention claimed is:

1. A method of handling Session Initiation Protocol messages in a wireless telecommunications device configured to use Session Initiation Protocol in communication with at least one other telecommunications device, wherein the device comprises:

a modem subsystem configured to deploy Internet Protocol Multimedia Subsystem services using Session Initiation Protocol and comprising a Session Initiation Protocol stack for exchanging Session Initiation Protocol messages between Internet Protocol Multimedia Subsystem services on the modem subsystem and an external Session Initiation Protocol proxy server; and an application processing engine configured to deploy Internet Protocol Multimedia Subsystem services using Session Initiation Protocol and comprising a Session Initiation Protocol stack for exchanging Session Initiation Protocol messages between Internet Protocol Multimedia Subsystem services on the application processing engine and the external Session Initiation Protocol proxy server, wherein the method comprises the steps of:
capturing Session Initiation Protocol messages from Internet Protocol Multimedia Subsystem services to the external Session Initiation Protocol proxy server in a logical element configured to function as a Session Initiation Protocol Back-to-Back User Agent with a Session Initiation Protocol stack connected to the Session Initiation Protocol stacks of the modem subsystem and the application processing engine and to the external Session Initiation Protocol proxy server; and sending from said logical element to the external Session Initiation Protocol proxy server Session Initiation Protocol messages based on said captured Session Initiation Protocol messages.

2. A method according to claim 1, wherein the method further comprises the steps of:
storing in said logical element, when an outgoing SIP REGISTER request message is received from a not registered Internet Protocol Multimedia Subsystem service deployed in the modem subsystem or the application processing engine, parameters specific for that Internet Protocol Multimedia Subsystem service;

merging, if parameters for other previously registered Internet Protocol Multimedia Subsystem services are already stored, the parameters for the not registered Internet Protocol Multimedia Subsystem service with the parameters for the previously registered Internet Protocol Multimedia Subsystem services; and sending a SIP REGISTER request message with the merged parameters to the external Session Initiation Protocol proxy server.

3. A method according to claim 2, wherein the method further comprises the step of:
sending, when a SIP REGISTER response message is received from the external Session Initiation Protocol proxy server, a SIP REGISTER response message to the not registered Internet Protocol Multimedia Subsystem service, from which the outgoing SIP REGISTER request message is received.

4. A method according to claim 1, wherein the method further comprises the steps of:
storing in said logical element, when a first outgoing SIP SUBSCRIBE request message is received from an Internet Protocol Multimedia Subsystem service deployed in the modem subsystem or the application processing engine, that Internet Protocol Multimedia Subsystem service as a subscriber;

sending a SIP SUBSCRIBE request message to the external Session Initiation Protocol proxy server; and sending, when a SIP SUBSCRIBE response message is received from the external Session Initiation Protocol proxy server, a SIP SUBSCRIBE response message to that Internet Protocol Multimedia Subsystem service.

5. A method according to claim 4, wherein the method further comprises the step of:
storing, when a further outgoing SIP SUBSCRIBE request message is received from an Internet Protocol Multimedia Subsystem service deployed in the modem subsystem or the application processing engine, that Internet Protocol Multimedia Subsystem service as a subscriber;

sending a SIP SUBSCRIBE response message to that Internet Protocol Multimedia Subsystem service; and sending a SIP NOTIFY request message to that Internet Protocol Multimedia Subsystem service with information from a SIP NOTIFY request message previously received from the external Session Initiation Protocol proxy server.

6. A wireless telecommunications device configured to use Session Initiation Protocol in communication with at least one other telecommunications device, the device comprising:
a modem subsystem configured to deploy Internet Protocol Multimedia Subsystem services using Session Initiation Protocol and comprising a Session Initiation Protocol stack for exchanging Session Initiation Protocol messages between Internet Protocol Multimedia Subsystem services on the modem subsystem and an external Session Initiation Protocol proxy server; and an application processing engine configured to deploy Internet Protocol Multimedia Subsystem services using Session Initiation Protocol and comprising a Session Initiation Protocol stack for exchanging Session Initiation Protocol messages between Internet Protocol Multimedia Subsystem services on the application processing engine and the external Session Initiation Protocol proxy server, wherein the device further comprises a logical element configured to:
capture Session Initiation Protocol messages from Internet Protocol Multimedia Subsystem services to the external Session Initiation Protocol proxy server and to function as a Session Initiation Protocol Back-to-Back User Agent with a Session Initiation Protocol stack connected to the Session Initiation Protocol stacks of the modem subsystem and the application processing engine and to the external Session Initiation Protocol proxy server; and send to the external Session Initiation Protocol proxy server Session Initiation Protocol messages based on said captured Session Initiation Protocol messages.

7. A wireless telecommunications device according to claim 6, wherein the device further comprises a packet filter with the Internet Protocol address and port number of the external Session Initiation Protocol proxy server, said packet filter being configured to forward packets matching the filter to said logical element.

8. A wireless telecommunications device according to claim 6, wherein said logical element is further configured to:
store, when an outgoing SIP REGISTER request message is received from a not registered Internet Protocol Multimedia Subsystem service deployed in the modem subsystem or the application processing engine, parameters specific for that Internet Protocol Multimedia Subsystem service;

merge, if parameters for other previously registered Internet Protocol Multimedia Subsystem services are already stored, the parameters for the not registered Internet Protocol Multimedia Subsystem service with the parameters for the previously registered Internet Protocol Multimedia Subsystem services; and send a SIP REGISTER request message with the merged parameters to the external Session Initiation Protocol proxy server.

9. A wireless telecommunications device according to claim 8, wherein said logical element is further configured to:
send, when a SIP REGISTER response message is received from the external Session Initiation Protocol proxy server, a SIP REGISTER response message to the not registered Internet Protocol Multimedia Subsystem service, from which the outgoing SIP REGISTER request message is received.

10. A wireless telecommunications device according to claim 6, wherein said logical element is further configured to:
store, when a first outgoing SIP SUBSCRIBE request message is received from an Internet Protocol Multimedia Subsystem service deployed in the modem subsystem or the application processing engine, that Internet Protocol Multimedia Subsystem service as a subscriber;
send a SIP SUBSCRIBE request message to the external Session Initiation Protocol proxy server; and
send, when a SIP SUBSCRIBE response message is received from the external Session Initiation Protocol proxy server, a SIP SUBSCRIBE response message to that Internet Protocol Multimedia Subsystem service.

11. A wireless telecommunications device according to claim 10, wherein said logical element is further configured to:
store, when a further outgoing SIP SUBSCRIBE request message is received from an Internet Protocol Multimedia Subsystem service deployed in the modem subsystem or the application processing engine, that Internet Protocol Multimedia Subsystem service as a subscriber;
send a SIP SUBSCRIBE response message to that Internet Protocol Multimedia Subsystem service; and
send a SIP NOTIFY request message to that Internet Protocol Multimedia Subsystem service with information from a SIP NOTIFY request message previously received from the external Session Initiation Protocol proxy server.

12. A wireless telecommunications device according to claim 6, wherein said logical element is further configured to:
send, when an incoming SIP OPTIONS request message is received, a SIP OPTIONS request message to all registered Internet Protocol Multimedia Subsystem services in the modem subsystem and the application processing engine;
collect SIP OPTIONS response messages from the registered Internet Protocol Multimedia Subsystem services;
merge received SIP OPTIONS response messages into a common SIP OPTIONS response message; and
send the merged SIP OPTIONS response message back to the originator of the incoming SIP OPTIONS request message.

13. A wireless telecommunications device claim 6, wherein said logical element is further configured to act as a Session Initiation Protocol proxy server for Session Initiation Protocol messages that are not handled by the Session Initiation Protocol Back-to-Back User Agent.

14. A non-transitory computer readable medium having stored thereon program code, which when run on a computer, causes the computer to perform a method of handling Session Initiation Protocol messages in a wireless telecommunications device configured to use Session Initiation Protocol in communication with at least one other telecommunications device, wherein the device comprises:
a modem subsystem configured to deploy Internet Protocol Multimedia Subsystem services using Session Initiation Protocol and comprising a Session Initiation Protocol stack for exchanging Session Initiation Protocol messages between Internet Protocol Multimedia Subsystem services on the modem subsystem and an external Session Initiation Protocol proxy server; and
an application processing engine configured to deploy Internet Protocol Multimedia Subsystem services using Session Initiation Protocol and comprising a Session Initiation Protocol stack for exchanging Session Initiation Protocol messages between Internet Protocol Multimedia Subsystem services on the application processing engine and the external Session Initiation Protocol proxy server,
wherein the method comprises the steps of:
capturing Session Initiation Protocol messages from Internet Protocol Multimedia Subsystem services to the external Session Initiation Protocol proxy server in a logical element configured to function as a Session Initiation Protocol Back-to-Back User Agent with a Session Initiation Protocol stack connected to the Session Initiation Protocol stacks of the modem subsystem and the application processing engine and to the external Session Initiation Protocol proxy server; and
sending from said logical element to the external Session Initiation Protocol proxy server Session Initiation Protocol messages based on said captured Session Initiation Protocol messages.

* * * * *